(12) United States Patent
Yun et al.

(10) Patent No.: US 8,866,355 B2
(45) Date of Patent: Oct. 21, 2014

(54) SWITCHED RELUCTANCE MOTOR

(71) Applicant: Samsung Electro-Mechanics Co., Ltd., Gyunggi-do (KR)

(72) Inventors: Tae Ho Yun, Gyunggi-do (KR); Se Joo Kim, Gyunggi-do (KR); Hyung Joon Kim, Gyunggi-do (KR); Jin Wook Baek, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 205 days.

(21) Appl. No.: 13/627,987

(22) Filed: Sep. 26, 2012

(65) Prior Publication Data
US 2013/0076164 A1 Mar. 28, 2013

(30) Foreign Application Priority Data

Sep. 28, 2011 (KR) .................. 10-2011-0098184

(51) Int. Cl.
*H02K 11/00* (2006.01)
(52) U.S. Cl.
USPC ..................... 310/68 R; 310/68 B; 310/71
(58) Field of Classification Search
USPC .................. 310/68 R, 68 B, 71, 168
See application file for complete search history.

(56) References Cited

U.S. PATENT DOCUMENTS

| | | | | |
|---|---|---|---|---|
| 4,719,381 A | * | 1/1988 | Miles | 310/166 |
| 5,053,664 A | * | 10/1991 | Kikuta et al. | 310/114 |
| 5,540,615 A | * | 7/1996 | Murtuza | 451/343 |
| 5,825,901 A | * | 10/1998 | Hisey | 381/165 |
| 2005/0264110 A1 | * | 12/2005 | Humphries et al. | 310/68 B |
| 2007/0080597 A1 | * | 4/2007 | Suzuki et al. | 310/156.47 |
| 2007/0194637 A1 | * | 8/2007 | Childe et al. | 310/51 |
| 2008/0278018 A1 | * | 11/2008 | Achor | 310/156.12 |
| 2010/0196174 A1 | * | 8/2010 | Lee | 417/410.1 |

FOREIGN PATENT DOCUMENTS

| | | |
|---|---|---|
| KR | 10-0226412 B1 | 10/1999 |
| KR | 10-2002-0007493 A | 1/2002 |
| KR | 10-0420714 B1 | 6/2004 |

OTHER PUBLICATIONS

Office Action dated Dec. 21, 2012 for Korean Patent Application No. 2011-0098184 and its English summary.

* cited by examiner

*Primary Examiner* — Thanh Lam
(74) *Attorney, Agent, or Firm* — Ladas & Parry, LLP

(57) ABSTRACT

Disclosed herein is a switched reluctance motor including: a rotor part including a rotor core having a shaft fixedly coupled to the center thereof and a plurality of rotor poles formed to be protruded from the rotor core; a stator part having the rotor part rotatably received therein and a plurality of stator salient poles formed to be protruded from the stator yoke; a balancing part selectively coupled to an upper portion or a lower portion of the rotor part and having a plurality of sensing grooves formed in an outer peripheral surface thereof; a motor housing provided with an opening part through which the shaft penetrates; and a position detecting unit disposed between the rotor part and the stator part and coupled to an inner portion of the motor housing.

10 Claims, 3 Drawing Sheets

SWITCHED RELUCTANCE MOTOR

CROSS REFERENCE TO RELATED APPLICATION

This application claims the benefit of Korean Patent Application No. 10-2011-0098184, filed on Sep. 28, 2011, entitled "Switched Reluctance Motor", which is hereby incorporated by reference in its entirety into this application.

BACKGROUND OF THE INVENTION

1. Technical Field

The present invention relates to a switched reluctance motor.

2. Description of the Related Art

A switched reluctance motor according to the prior art is configured to include: a stator part including a stator yoke and a plurality of stator salient poles protruded from the stator yoke; and a rotor part including a rotor core and a plurality of rotor salient poles protruded from the rotor core so as to face the stator salient poles and rotatably received in the stator part.

In the case of a method for detecting a rotation position of the rotor part according to the prior art, a position detecting unit for detecting a position of the rotor part is assembled outside the switched reluctance motor, thereby detecting the position of the rotor part.

However, in the case of this method according to the prior art, the entire size of the switched reluctance motor is increased. In addition, the position detecting unit is disposed outside the switched reluctance motor, such that it is damaged due to external impact.

Further, since the position detecting unit is disposed outside the switched reluctance motor, an expensive sensor is mounted in order to accurately sense the position of the rotor part, such that a manufacturing cost is increased.

SUMMARY OF THE INVENTION

The present invention has been made in an effort to provide a switched reluctance motor including a balancing part rotating integrally with a rotating rotor part so that a rotation position of the rotor part may be easily detected using a position detecting unit and having a sensing groove formed in an outer peripheral portion thereof.

According to a preferred embodiment of the present invention, there is provided a switched reluctance motor including: a rotor part including a rotor core having a shaft fixedly coupled to the center thereof and a plurality of rotor poles formed to be protruded from the rotor core; a stator part having the rotor part rotatably received therein and a plurality of stator salient poles formed to be protruded from the stator yoke so as to face the rotor poles; a balancing part selectively coupled to an upper portion or a lower portion of the rotor part and having a plurality of sensing grooves formed in an outer peripheral surface thereof; a motor housing provided with an opening part through which the shaft penetrates and coupled to an outer side of the stator part so as to enclose the entire stator part; and a position detecting unit disposed between the rotor part and the stator part and coupled to an inner portion of the motor housing in order to sense sides of the sensing grooves based on the shaft.

The balancing part may be made of a plastic material, and the sensing groove may have a shape corresponding to a clearance formed between the rotor poles.

The sensing grooves may be formed by cutting-machining a portion of an outer peripheral surface of the balancing part and a portion of an end portion of the balancing part facing an inner side of the motor housing.

The position detecting unit may include: a fixed member having a plate shape and fixedly coupled to an inner side of the motor housing; a printed circuit board fixedly coupled to an upper portion of the fixed member and having a plurality of coupling grooves formed therein; and a position detecting sensor fixedly coupled to an upper portion of the printed circuit board and sensing the sensing grooves.

The position detecting sensor may be a reflective type photo sensor.

The fixed member may include: an upper guide part formed to be protruded toward a direction in which the fixed member is connected to the printed circuit board to thereby guide the connection between the fixed member and the printed circuit board; a lower guide part formed to be protruded toward a direction in which the fixed member is connected to the motor housing to thereby guide the connection between the fixed member and the motor housing; a plurality of coupling protrusions fixedly coupled to the coupling grooves of the printed circuit board; and a plurality of connection parts formed to be protruded toward the motor housing to thereby be fixedly coupled to the inner side of the motor housing.

The motor housing may include a support part formed on an inner side thereof in a direction in which the fixed member is coupled thereto, wherein the support part supports the fixed member and includes connection holes into which the connection parts are inserted.

The motor housing may further include a guide groove into which the lower guide part inserted.

The printed circuit board may further include a guide groove into which the upper guide part is inserted.

The stator salient poles may have coils wound multiple times therearound, wherein the coils receive power from the outside.

DESCRIPTION OF THE PREFERRED EMBODIMENTS

Figure 1:
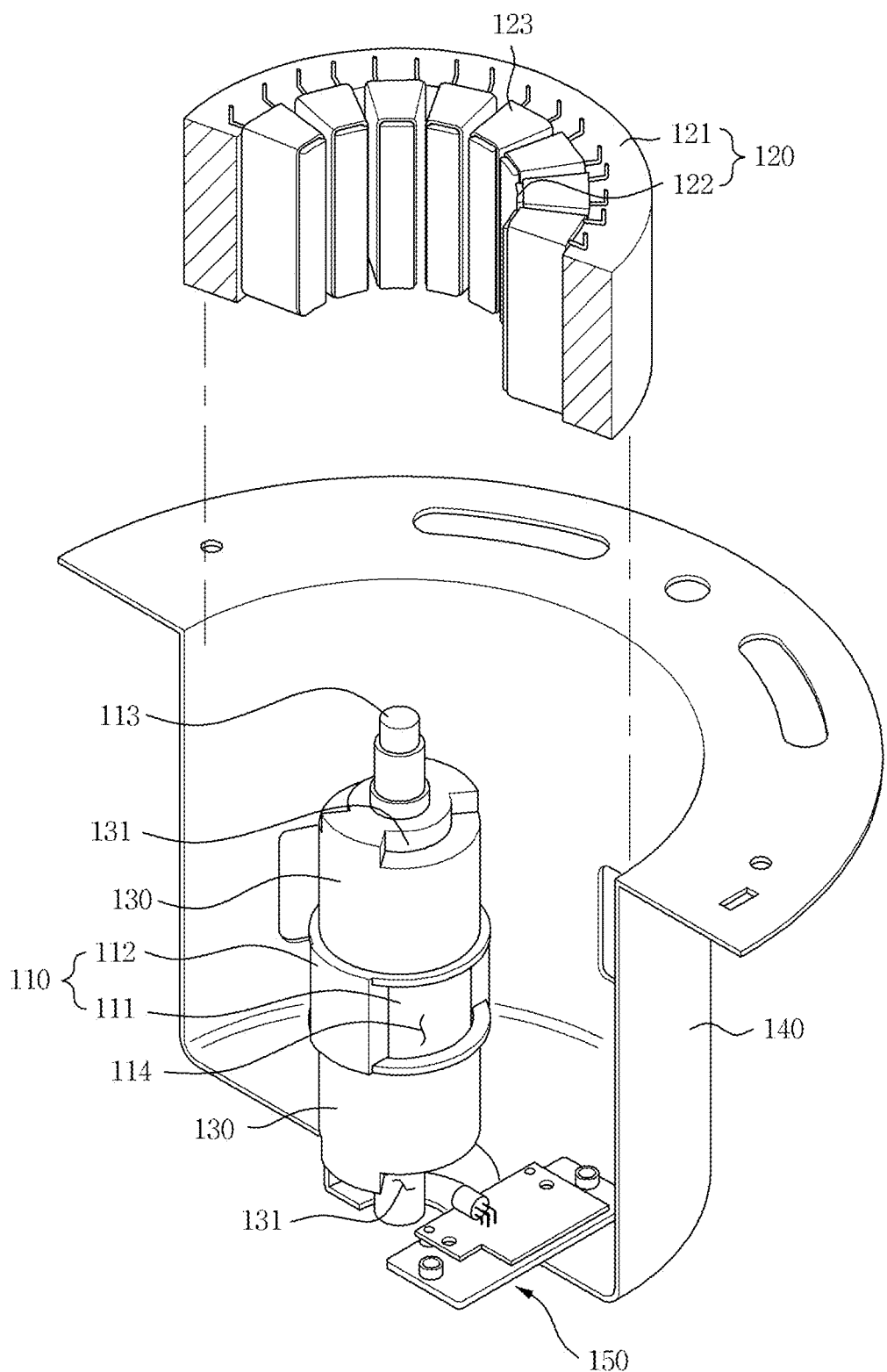
FIG. 1 is a schematic exploded perspective view of a switched reluctance motor according to a preferred embodiment of the present invention.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
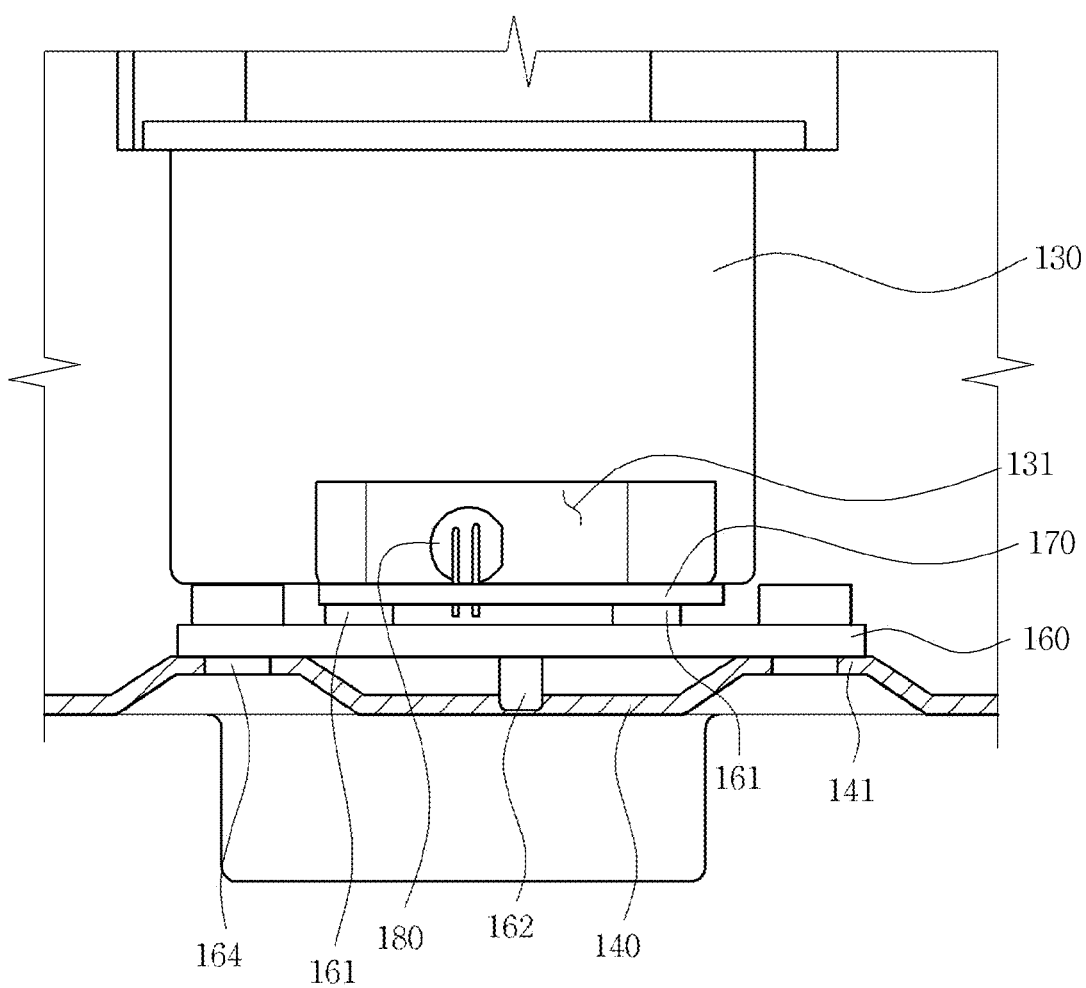
FIG. 2 is a side view of the switched reluctance motor shown in FIG. 1.
Figure 3:
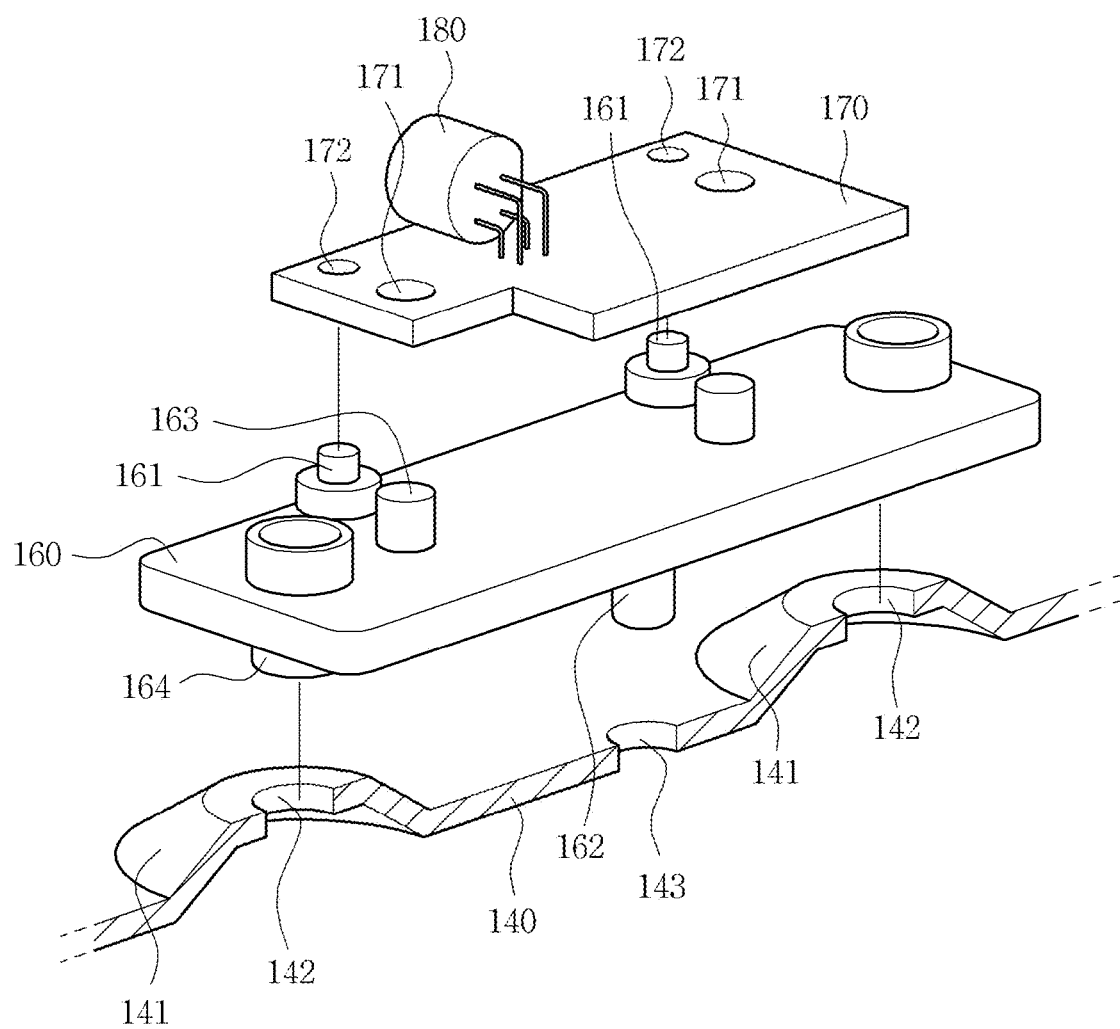
FIG. 3 is a schematic exploded perspective view of a position detecting unit configuring the switched reluctance motor shown in FIG. 1.

FIG. 1 is a schematic exploded perspective view of a switched reluctance motor according to a preferred embodiment of the present invention; FIG. 2 is a side view of the switched reluctance motor shown in FIG. 1; and FIG. 3 is a schematic exploded perspective view of a position detecting unit configuring the switched reluctance motor shown in FIG. 1.

As shown, the switched reluctance motor 100 includes a rotor part 110, a stator part 120 having the rotor part 110 rotatably received therein, a balancing part 130, a motor housing 140, and a position detecting unit 150.

The rotor part 110 includes a rotor core 111 made of a metal material and a plurality of rotor poles 112.

More specifically, a hollow hole is formed at a central portion of the rotor core 111, and a shaft 113 is fixedly coupled to the hollow hole to transfer rotational force of the rotor part 110 to the outside.

Further, the plurality of rotor poles 112 are formed to be protruded along an outer peripheral surface of the rotor core 111.

As shown, the stator part 120 includes a stator yoke 121 made of a metal material and a plurality of stator salient poles 122.

More specifically, the stator yoke 121 may have a cylindrical shape in which it has an inner diameter larger than an outer diameter of the rotor part 110 so that the rotor part 110 is rotatably received therein and has a hollow hole formed therein.

In addition, the plurality of stator salient poles 122 are formed to be protruded from an inner peripheral surface of the stator yoke 121 so as to face the rotor pole 112 and have coils 123 wound multiple times therearound, wherein the coils 123 receive power from the outside.

The balancing part 130 is made of a plastic material so that cutting-machining is easily performed, has a hollow hole formed at the center thereof so that the shaft 113 penetrates therethrough, and is selectively coupled to an upper portion or a lower portion of the rotor part 110.

As shown in FIG. 1, the balancing part 130 according to the preferred embodiment of the present invention is coupled to each of the upper and lower portions of the rotor part 110.

In addition, a plurality of sensing grooves 131 sensed by the position detecting unit 150 to be described below are formed at a portion of an outer peripheral surface of the balancing part 130 and a portion of an end portion of the balancing part 130 facing an inner side of the motor housing 140 through cutting-machining.

More specifically, as shown in FIGS. 1 and 2, the sensing groove 131 may have a shape corresponding to a clearance 114 formed between one rotor pole 112 and another rotor pole 112 described above.

That is, since four clearances are formed between the rotor poles when a total of four rotor poles are formed to be protruded from the rotor core, four sensing grooves may be formed in the balancing part.

Therefore, as shown in FIG. 1, since the rotor part 110 according to the preferred embodiment of the present invention includes two rotor poles 1122, two sensing grooves 131 are formed in the balancing part 130.

Therefore, as shown in FIG. 2, since the balancing part 130 rotates integrally with the rotor part 110, when sides of the sensing grooves 131 based on the shaft 113 are sensed using the position detecting unit 150, the rotor poles 112 configuring the rotor part 110 and the clearances 114 formed between the rotor poles 112 may be discriminated. As a result, a rotation position of the rotor part may be easily detected.

The motor housing 140 is provided with an opening part through which the shaft 113 penetrates, and may be coupled to an outer side of the stator part 120 so as to enclose the entire stator part 120 in order to protect the stator part 120 from external impact and prevent other foreign materials from being introduced into the rotor part 110 and the stator part 120.

Further, the motor housing 140 includes a support part 141 formed on an inner side thereof, wherein the support part 141 includes connection holes 142 having the position detecting unit 150 to be described below fixedly coupled thereto simultaneously with supporting the position detecting unit 150.

As shown in FIG. 1, the position detecting unit 150 according to the preferred embodiment of the present invention may be disposed between the rotor part 110 and the stator part 120 and be coupled to an inner portion of the motor housing 140 so as to correspond to the sensing groove 131.

More specifically, as shown in FIG. 3, the position detecting unit 150 includes a fixed member 160, a printed circuit board 170, and a position detecting sensor 180.

The fixed member 160 has a plate shape and is fixedly coupled to the inner side of the motor housing 140.

More specifically, the fixed member 160 is positioned between the rotor part 110 and the stator part 120 so that the position detecting sensor 180 to be described below easily senses the sensing groove 131 formed in the balancing member 130.

In addition, the fixed member 160 includes an upper guide part 161, a lower guide part 162, a plurality of coupling protrusions 163, and a plurality of connection parts 164.

As shown, the upper guide part 161 is formed to be protruded from an upper surface of the fixed member 160 having a plate shape toward a direction in which the fixed member is connected to the printed circuit board 170 to thereby perform a guide function facilitating the connection between the fixed member and the printed circuit board 170.

In addition, the lower guide part 162 is formed to be protruded from a lower surface of the fixed member 160 toward a direction in which the fixed member is connected to the motor housing 140 to thereby perform a guide function facilitating the connection between the fixed member and the motor housing 140.

Therefore, the motor housing 140 includes a guide groove 143 formed at a position corresponding to the lower guide part 162 in order to receive the lower guide part 162 therein.

In addition, the coupling protrusions 163 are fixedly coupled to a coupling grooves 171 formed in the printed circuit board 170.

In addition, the connection part 164 is formed to be protruded from the lower surface of the fixed member 160 having a plate shape toward the inner side of the motor housing 140 to be coupled to the connection hole 142 of the motor housing 140.

The printed circuit board 170 is mounted on an upper portion of the fixed member 160 by coupling between the coupling grooves 171 thereof and the coupling protrusions 162 in a guide direction of the guide part 161 of the fixed member 160.

In addition, the printed circuit board 170 includes a guide groove 172 formed at a position corresponding to the upper guide part 161 in order to receive the upper guide part 161 therein.

The position detecting sensor 180 is fixedly coupled to an upper portion of the printed circuit board and senses the sensing groove 131 of the balancing part 130 rotating integrally with the rotor part 110 to detect a rotation position of the rotor part 110.

Further, according to the preferred embodiment of the present invention, as the position detecting sensor 180, a reflective type photo sensor may be used.

According to the preferred embodiments of the present invention, the sensing grooves are formed in the outer peripheral surface of the balancing part and are sensed by the position detecting unit, thereby making it possible to easily detect the rotation position of the rotor part.

In addition, since the balancing part rotates integrally with the rotor part, a groove for sensing needs not to be separately formed in the rotor part side, such that a manufacturing cost may be reduced.

Further, the position detecting unit detecting the rotation position of the rotor part is coupled to the inner portion of the motor housing, thereby making it possible to prevent a damage of the position detecting unit due to external impact and manufacture the switched reluctance motor having a small size.

Furthermore, since the sensing groove is formed by cutting a portion of the balancing part for adjusting the center of rotation of the rotor part configuring the switched reluctance motor, a separate manufacturing process is not required, such that a manufacturing cost of the switched reluctance motor is reduced and a product yield is increased.

Although the preferred embodiments of the present invention have been disclosed for illustrative purposes, they are for specifically explaining the present invention and thus a switched reluctance motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A switched reluctance motor comprising:
    a rotor part including a rotor core having a shaft fixedly coupled to the center thereof and a plurality of rotor poles formed to be protruded from the rotor core;
    a stator part having the rotor part rotatably received therein and a plurality of stator salient poles formed to be protruded from the stator yoke so as to face the rotor poles;
    a balancing part selectively coupled to an upper portion or a lower portion of the rotor part and having a plurality of sensing grooves formed in an outer peripheral surface thereof;
    a motor housing provided with an opening part through which the shaft penetrates and coupled to an outer side of the stator part so as to enclose the entire stator part; and
    a position detecting unit disposed between the rotor part and the stator part and coupled to an inner portion of the motor housing in order to sense sides of the sensing grooves based on the shaft.

2. The switched reluctance motor as set forth in claim 1, wherein the balancing part is made of a plastic material, and the sensing groove has a shape corresponding to a clearance formed between the rotor poles.

3. The switched reluctance motor as set forth in claim 2, wherein the sensing grooves are formed by cutting-machining a portion of an outer peripheral surface of the balancing part and a portion of an end portion of the balancing part facing an inner side of the motor housing.

4. The switched reluctance motor as set forth in claim 1, wherein the position detecting unit includes:
    a fixed member having a plate shape and fixedly coupled to an inner side of the motor housing;
    a printed circuit board fixedly coupled to an upper portion of the fixed member and having a plurality of coupling grooves formed therein; and
    a position detecting sensor fixedly coupled to an upper portion of the printed circuit board and sensing the sensing grooves.

5. The switched reluctance motor as set forth in claim 4, wherein the position detecting sensor is a reflective type photo sensor.

6. The switched reluctance motor as set forth in claim 4, wherein the fixed member includes:
    an upper guide part formed to be protruded toward a direction in which the fixed member is connected to the printed circuit board to thereby guide the connection between the fixed member and the printed circuit board;
    a lower guide part formed to be protruded toward a direction in which the fixed member is connected to the motor housing to thereby guide the connection between the fixed member and the motor housing;
    a plurality of coupling protrusions fixedly coupled to the coupling grooves of the printed circuit board; and
    a plurality of connection parts formed to be protruded toward the motor housing to thereby be fixedly coupled to the inner side of the motor housing.

7. The switched reluctance motor as set forth in claim 6, wherein the motor housing includes a support part formed on an inner side thereof in a direction in which the fixed member is coupled thereto, the support part supporting the fixed member and including connection holes into which the connection parts are inserted.

8. The switched reluctance motor as set forth in claim 6, wherein the motor housing further includes a guide groove into which the lower guide part inserted.

9. The switched reluctance motor as set forth in claim 6, wherein the printed circuit board further includes a guide groove into which the upper guide part is inserted.

10. The switched reluctance motor as set forth in claim 1, wherein the stator salient poles have coils wound multiple times therearound, the coils receiving power from the outside.

* * * * *